United States Patent
Cogen et al.

Patent Number: 5,766,761
Date of Patent: Jun. 16, 1998

[54] TELEPHONE CABLES

[75] Inventors: Jeffrey Morris Cogen, Flemington; Michael John Keogh; Geoffrey David Brown, both of Bridgewater, all of N.J.

[73] Assignee: Union Carbide Chemicals & Plastics Technology Corporation, Danbury, Conn.

[21] Appl. No.: 763,477

[22] Filed: Dec. 11, 1996

[51] Int. Cl.⁶ ............................................. B32B 15/00
[52] U.S. Cl. .......................... 428/379; 428/372; 428/378; 428/383; 174/23 C; 174/23 R; 174/110 PM; 174/110 SR; 174/113 R; 174/120 SR
[58] Field of Search ..................... 428/375, 379, 428/383; 174/23 C, 113 R, 110 PM, 120 SR

[56] References Cited

U.S. PATENT DOCUMENTS

| | | |
|---|---|---|
| 3,888,709 | 6/1975 | Burk . |
| 3,888,710 | 6/1975 | Burk . |
| 4,044,200 | 8/1977 | Turbett . |
| 5,380,591 | 1/1995 | Keogh et al. .................... 428/379 |
| 5,474,847 | 12/1995 | Keogh et al. . |
| 5,575,952 | 11/1996 | Keogh et al. . |

FOREIGN PATENT DOCUMENTS

| | | |
|---|---|---|
| 290388 | 11/1988 | European Pat. Off. . |
| 516192 | 12/1992 | European Pat. Off. . |
| 620563 | 10/1994 | European Pat. Off. . |
| W09324935 | 2/1993 | WIPO . |

Primary Examiner—Marion E. McCamish
Assistant Examiner—J. M. Gray
Attorney, Agent, or Firm—Saul R. Bresch

[57] ABSTRACT

A cable construction comprising the following components: (i) a plurality of insulated electrical conductors having interstices therebetween, said insulation comprising (a) one or more polyolefins selected from the group consisting of polyethylene, polypropylene, and mixtures thereof, and, blended therewith, (b) a mixture containing one or more alkylhydroxy-phenylalkanoyl hydrazines and one or two functionalized hindered amines; (ii) hydrocarbon cable filler grease within the interstices; and (iii) a sheath surrounding components (i) and (ii) wherein said hindered amines have the following structural formulae in which n is about 2 to about 10:

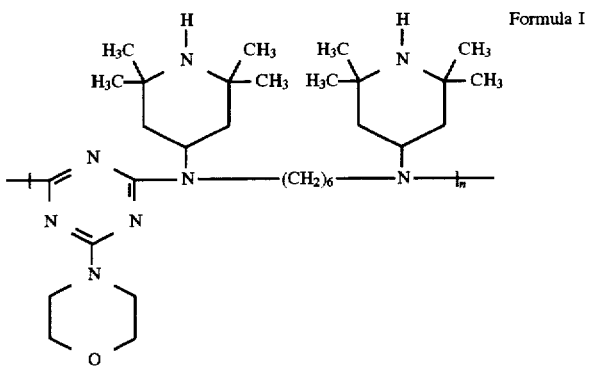

Formula I or

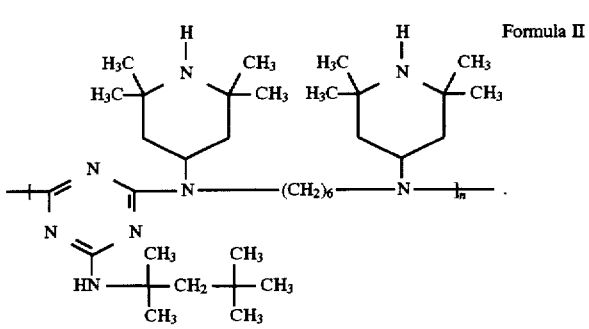

Formula II

10 Claims, No Drawings

TELEPHONE CABLES

TECHNICAL FIELD

This invention relates to wire and cable and the insulation and jacketing therefor and, more particularly, to telephone cable.

BACKGROUND INFORMATION

A typical telephone cable is constructed of twisted pairs of metal conductors for signal transmission. Each conductor is insulated with a polymeric material. The desired number of transmission pairs is assembled into a circular cable core, which is protected by a cable sheath incorporating metal foil and/or armor in combination with a polymeric jacketing material. The sheathing protects the transmission core against mechanical and, to some extent, environmental damage.

Of particular interest are the grease-filled telephone cables. These cables were developed in order to minimize the risk of water penetration, which can severely upset electrical signal transmission quality. A watertight cable is provided by filling the air spaces in the cable interstices with a hydrocarbon cable filler grease. While the cable filler grease extracts a portion of the antioxidants from the insulation, the watertight cable will not exhibit premature oxidative failure as long as the cable maintains its integrity.

In the cable transmission network, however, junctions of two or more watertight cables are required and this joining is often accomplished in an outdoor enclosure known as a pedestal (an interconnection box). Inside the pedestal, the cable sheathing is removed, the cable filler grease is wiped off, and the transmission wires are interconnected. The pedestal with its now exposed insulated wires is usually subjected to a severe environment, a combination of high temperature, air, and moisture. This environment together with the depletion by extraction of those antioxidants presently used in grease-filled cable can cause the insulation in the pedestal to exhibit premature oxidative failure. In its final stage, this failure is reflected in oxidatively embrittled insulation prone to cracking and flaking together with a loss of electrical transmission performance.

To counter the depletion of antioxidants, it has been proposed to add high levels of antioxidants to the polymeric insulation. However, this not only alters the performance characteristics of the insulation, but is economically unsound in view of the high cost of antioxidants. There is a need, then, for antioxidants which will resist cable filler grease extraction to the extent necessary to prevent premature oxidative failure and ensure the 30 to 40 year service life desired by industry.

Disclosure of the Invention

An object of this invention, therefore, is to provide a grease-filled cable construction containing antioxidants, which will resist extraction and be maintained at a satisfactory stabilizing level. Other objects and advantages will become apparent hereinafter.

According to the invention, a cable construction has been discovered which meets the above object. The cable construction comprises the following components: (i) a plurality of insulated electrical conductors having interstices therebetween, said insulation comprising (a) one or more polyolefins selected from the group consisting of polyethylene, polypropylene, and mixtures thereof, and, blended therewith, (b) a mixture containing one or more alkylhydroxy-phenylalkanoyl hydrazines and one or two functionalized hindered amines; (ii) hydrocarbon cable filler grease within the interstices; and (iii) a sheath surrounding components (i) and (ii) wherein said hindered amines have the following structural formulae in which n is about 2 to about 10:

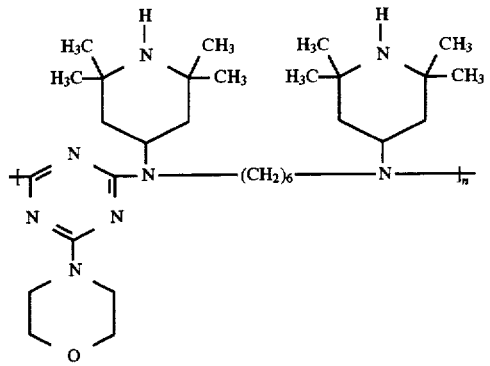

Formula I or

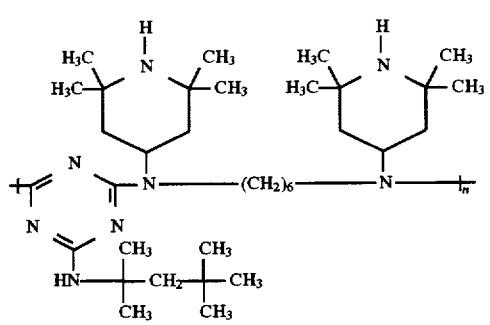

Formula II

DESCRIPTION OF THE PREFERRED EMBODIMENTS

In U.S. Pat. No. 5,380,591, for example, it was considered that the hindered amines, which are useful in grease filled cable, were those which have limited solubility in the hydrocarbon cable filler grease. Thus, an analogy was drawn between solubility in the filler grease and solubility in n-hexane at 20 degrees C., and the preferred hindered amines were said to be those having a solubility in n-hexane at 20 degrees C. of less than about one percent by weight based on the weight of the n-hexane.

Applicants have unexpectedly found that the hindered amines useful in this invention have a significant solubility in hydrocarbon cable filler grease, i.e., using the same analogy, they have a solubility in n-hexane at 20 degrees C. of greater than about twenty percent by weight based on the weight of the n-hexane, and yet in the grease filled cable environment, they resist extraction just as the preferred hindered amines of U.S. Pat. No. 5,380,591.

The polyolefins used in this invention are generally thermoplastic resins, which are crosslinkable. They can be homopolymers or copolymers produced from two or more comonomers, or a blend of two or more of these polymers, conventionally used in film, sheet, and tubing, and as jacketing and/or insulating materials in wire and cable applications. The monomers useful in the production of these homopolymers and copolymers can have 2 to 20 carbon atoms, and preferably have 2 to 12 carbon atoms. Examples of these monomers are alpha-olefins such as ethylene, propylene, 1-butene, 1-hexene, 4-methyl-1- pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene, commonly the third monomer in a terpolymer; other monomers such as styrene, p-methyl styrene, alpha-methyl styrene, p-chloro styrene, vinyl naphthalene, and similar aryl olefins; nitriles such as acrylonitrile, methacrylonitrile, and alpha-chloroacry-lonitrile; vinyl methyl ketone, vinyl methyl ether, vinylidene chloride, maleic anhydride, vinyl chloride, vinylidene chloride, vinyl alcohol, tetrafluoroethylene, and chlorotri-fluoroethylene; and acrylic acid, methacrylic acid, and other similar unsaturated acids.

The homopolymers and copolymers referred to can be non-halogenated, or halogenated in a conventional manner, generally with chlorine or bromine. Examples of halogenated polymers are polyvinyl chloride, polyvinylidene chloride, and polytetra-fluoroethylene. The homopolymers and copolymers of ethylene and propylene are preferred, both in the non-halogenated and halogenated form. Included in this preferred group are terpolymers such as ethylene/propylene/diene monomer rubbers.

Other examples of ethylene polymers are as follows: a high pressure homopolymer of ethylene; a copolymer of ethylene and one or more alpha-olefins having 3 to 12 carbon atoms; a homopolymer or copolymer of ethylene having a hydrolyzable silane grafted to their backbones; a copolymer of ethylene and an alkenyl triakloxy silane such as trimethoxy vinyl silane; or a copolymer of an alpha-olefin having 2 to 12 carbon atoms and an unsaturated ester having 4 to 20 carbon atoms, e.g., an ethylene/ethyl acrylate or vinyl acetate copolymer; an ethylene/ethyl acrylate or vinyl acetate/hydrolyzable silane terpolymer; and ethylene/ethyl acrylate or vinyl acetate copolymers having a hydrolyzable silane grafted to their backbones.

With respect to polypropylene: homopolymers and copolymers of propylene and one or more other alpha-olefins wherein the portion of the copolymer based on propylene is at least about 60 percent by weight based on the weight of the copolymer can be used to provide the polyolefin of the invention. Polypropylene can be prepared by conventional processes such as the process described in U.S. Pat. No. 4,414,132. Preferred polypropylene alpha-olefin comonomers are those having 2 or 4 to 12 carbon atoms.

The homopolymer or copolymers can be crosslinked or cured with an organic peroxide, or to make them hydrolyzable, they can be grafted with an alkenyl trialkoxy silane in the presence of an organic peroxide which acts as a free radical generator or catalyst. Useful alkenyl trialkoxy silanes include the vinyl trialkoxy silanes such as vinyl trimethoxy silane, vinyl triethoxy silane, and vinyl triisopropoxy silane. The alkenyl and alkoxy radicals can have 1 to 30 carbon atoms and preferably have 1 to 12 carbon atoms. The hydrolyzable polymers can be moisture cured in the presence of a silanol condensation catalyst such as dibutyl tin dilaurate, dioctyl tin maleate, stannous acetate, stannous octoate, lead naphthenate, zinc octoate, iron 2-ethyl hexoate, and other metal carboxylates.

The homopolymers or copolymers of ethylene wherein ethylene is the primary comonomer and the homopolymers and copolymers of propylene wherein propylene is the primary comonomer may be referred to herein as polyethylene and polypropylene, respectively.

For each 100 parts by weight of polyolefin, the other components of the insulation mixture can be present in about the following proportions:

|  | Parts by Weight | |
| Component | Broad Range | Preferred Range |
| --- | --- | --- |
| (i) hydrazine | at least 0.1 | 0.3 to 2.0 |
| (ii) hindered amine | at least 0.01 | 0.05 to 1.0 |
| (iii) grease | 3 to 30 | 5 to 25 |

Insofar as the hydrazine and the hindered amine are concerned, there is no upper limit except the bounds of practicality, which are dictated by economics, i.e., the cost of the antioxidants. In this vein, most preferred upper limits are about 1.0 and about 0.5 part by weight, respectively.

The weight ratio of hydrazine to hindered amine can be in the range of about 1:1 to about 20:1, and is preferably in the range of about 2:1 to about 15:1. A most preferred ratio is about 3:1 to about 10:1. It should be noted that the hindered amine is effective at very low use levels relative to the hydrazine.

Alkylhydroxyphenylalkanoyl hydrazines are described in U.S. Pat. No. 3,660,438 and 3,773,722.

A preferred general structural formula for hydrazines useful in the invention is as follows:

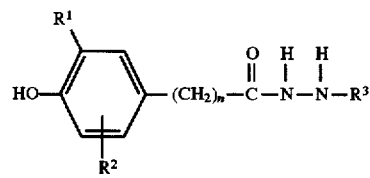

wherein n is 0 or an integer from 1 to 5;

$R^1$ is an alkyl having 1 to 6 carbon atoms;

$R^2$ is hydrogen or $R^1$; and $R^3$ is hydrogen, an alkanoyl having 2 to 18 carbon atoms, or the following structural formula:

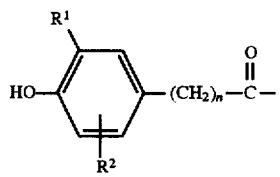

The hindered amines useful in this invention have the following structural formulae, wherein n is from about 2 to about 10:

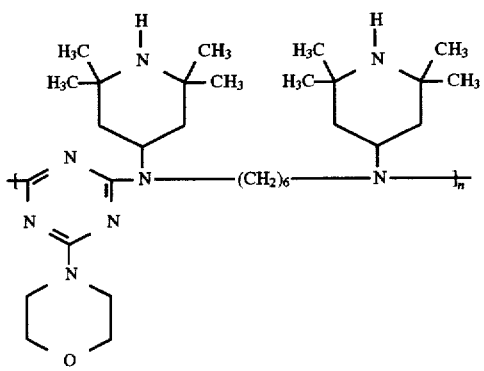

Formula I and

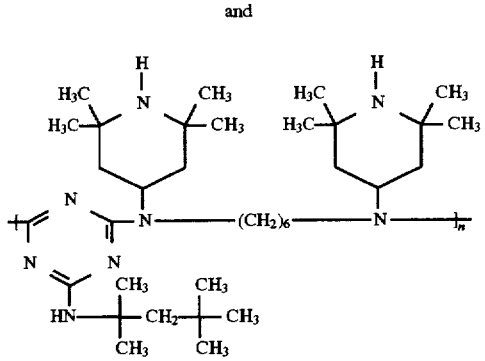

Formula II

A distinguishing characteristic of these particular hindered amines is that they have a number average molecular weight (Mn) greater than about 1000.

Formula I is exemplified by poly[(6-morpholino-s-triazine-2,4-diyl) [2,2,6,6-tetramethyl-4-piperidyl) imino]-hexamethylene[(2,2,6,6-tetramethyl-4-piperidyl) imino]], having a CAS registry number of 082451-48-7.

Formula II is exemplified by poly[[6-[(1,1,3,3-tetramethylbutyl)amino]-s-triazine-2,4-diyl][(2,2,6,6-tetramethyl-4-piperidyl) imino] hexamethylene[(2,2,6,6-tetramethyl-4-piperidyl) imino]], having a CAS registry number of 70624-18-9.

Hydrocarbon cable filler grease is a mixture of hydrocarbon compounds, which is semisolid at use temperatures. It is known industrially as "cable filling compound". A typical requirement of cable filling compounds is that the grease has minimal leakage from the cut end of a cable at a 60° C. or higher temperature rating. Another typical requirement is that the grease resist water leakage through a short length of cut cable when water pressure is applied at one end. Among other typical requirements are cost competitiveness; minimal detrimental effect on signal transmission; minimal detrimental effect on the physical characteristics of the polymeric insulation and cable sheathing materials; thermal and oxidative stability; and cable fabrication processability.

Cable fabrication can be accomplished by heating the cable filling compound to a temperature of approximately 100° C. This liquefies the filling compound so that it can be pumped into the multiconductor cable core to fully impregnate the interstices and eliminate all air space. Alternatively, thixotropic cable filling compounds using shear induced flow can be processed at reduced temperatures in the same manner. A cross section of a typical finished grease-filled cable transmission core is made up of about 52 percent insulated wire and about 48 percent interstices in terms of the areas of the total cross section. Since the interstices are completely filled with cable filling compound, a filled cable core typically contains about 48 percent by volume of cable filling compound.

The cable filling compound or one or more of its hydrocarbon constituents enter the insulation through absorption from the interstices. Generally, the insulation absorbs about 3 to about 30 parts by weight of cable filling compound or one or more of its hydrocarbon constituents, in toto, based on 100 parts by weight of polyolefin. A typical absorption is in the range of a total of about 5 to about 25 parts by weight per 100 parts by weight of polyolefin.

It will be appreciated by those skilled in the art that the combination of resin, cable filling compound constituents, and antioxidants in the insulation is more difficult to stabilize than, an insulating layer containing only resin and antioxidant, and no cable filling compound constituent.

Examples of hydrocarbon cable filler grease (cable filling compound) are petrolatum; petrolatum/polyolefin wax mixtures; oil modified thermoplastic rubber (ETPR or extended thermoplastic rubber); paraffin oil; naphthenic oil; mineral oil; the aforementioned oils thickened with a residual oil, petrolatum, or wax; polyethylene wax; mineral oil/rubber block copolymer mixture; lubricating grease; and various mixtures thereof, all of which meet industrial requirements similar to those typified above.

Generally, cable filling compounds extract insulation antioxidants and, as noted above, are absorbed into the polymeric insulation. Since each cable filling compound contains several hydrocarbons, both the absorption and the extraction behavior are preferential toward the lower molecular weight hydrocarbon wax and oil constituents. It is found that the insulation composition with its antioxidant not only has to resist extraction, but has to provide sufficient stabilization (i) to mediate against the copper conductor, which is a potential catalyst for insulation oxidative degradation; (ii) to counter the effect of residuals of chemical blowing agents present in cellular and cellular/solid (foam/skin) polymeric foamed insulation; and (iii) to counter the effect of absorbed constituents from the cable filling compound.

The polyolefin can be one polyolefin or a blend of polyolefins. The hydrazine and the functionalized hindered amine are blended with the polyolefin. The composition containing the foregoing can be used in combination with disulfides, phosphites or other non-amine antioxidants in molar ratios of about 1:1 to about 1:2 for additional oxidative and thermal stability, but, of course, it must be determined to what extent these latter compounds are extracted by the grease since this could affect the efficacy of the combination.

The following conventional additives can be added in conventional amounts if desired: ultraviolet absorbers, antistatic agents, pigments, dyes, fillers, slip agents, fire retardants, stabilizers, crosslinking agents, halogen scavengers, smoke inhibitors, crosslinking boosters, processing aids, e.g., metal carboxylates, lubricants, plasticizers, viscosity control agents, and blowing agents such as azodicarbonamide. The fillers can include, among others, magnesium hydroxide and alumina trihydrate. As noted, other antioxidants and/or metal deactivators can also be used, but for these or any of the other additives, resistance to grease extraction must be considered.

Additional information concerning grease-filled cable can be found in Eoll, The Aging of Filled Cable with Cellular Insulation, International Wire & Cable Symposium Proceeding 1978, pages 156 to 170, and Mitchell et al, Development, Characterization, and Performance of an Improved Cable Filling Compound, International Wire & Cable Symposium Proceeding 1980, pages 15 to 25. The latter publication shows a typical cable construction on page 16 and gives additional examples of cable filling compounds.

The patents and other publications mentioned in this specification are incorporated by reference herein.

The invention is illustrated by the following examples.

EXAMPLES 1 to 3

Various materials used in the examples are as follows:

Polyethylene I is a copolymer of ethylene and 1-hexene. The density is 0.946 gram per cubic centimeter and the melt index is 0.80 to 0.95 gram per 10 minutes.

Antioxidant A is 1,2-bis(3,5-di-tert-butyl-4-hydroxyhydrocinnamoyl)hydrazine.

Antioxidant B has the following structural formula. It is referred to above as Formula I:

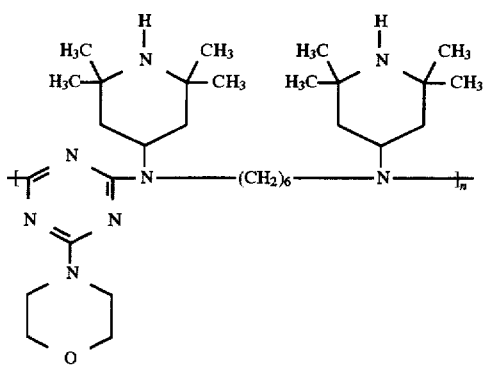

In the case of Antioxidant B, Mn is 1600.

Antioxidant C has the following structural formula. It is referred to above as Formula II.

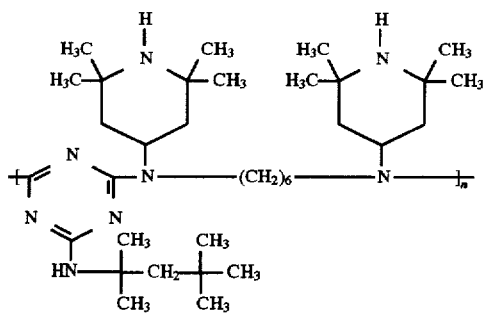

In the case of Antioxidant C, Mn is 2600 to 3300.

10 mil polyethylene plaques are prepared for oxidation induction time (OIT) testing. The plaques are prepared from a mixture of polyethylene I and the antioxidants mentioned above. The parts by weight of each are set forth in the accompanying Table.

A laboratory procedure simulating the grease filled cable application is used to demonstrate performance. Resin samples incorporating specified antioxidants are prepared. The samples are first pelletized and then formed into approximately 10 mil (0.010 inch) thick test plaques using ASTM D-1928 methods as a guideline. There is a final melt mixing on a two roll mill or laboratory Brabender™ type mixer followed by preparation of the test plaques using a compressor molding press at 150° C. Initial oxygen induction time is measured on these test plaques.

A supply of hydrocarbon cable filler grease is heated to about 80° C. and well mixed to insure uniformity. A supply of 30 millimeter dram vials are then each filled to approximately 25 millimeters with the cable filler grease. These vials are then cooled to room temperature for subsequent use. An oil extended thermoplastic rubber (ETPR) type cable filler grease is the hydrocarbon cable filler grease used in these examples. It is a typical cable filling compound.

Each ten mil test plaque is then cut to provide about twenty approximately one-half inch square test specimens. Before testing, each vial is reheated to about 70° C. to allow for the easy insertion of the test specimens. The specimens are inserted into the vial one at a time together with careful wetting of all surfaces with the cable filler grease. After all of the specimens have been inserted, the vials are loosely capped and placed in a 70° C. circulating air oven. Specimens are removed after 1, 2, and 4 weeks. The specimens are then wiped free of cable filler grease with a tissue and aged in a air oven at 90° C. A sample is then removed after 4 weeks at 90° C. (8 weeks of aging total). The initial, 1, 2, 4, and 8 week samples are then tested for OIT.

OIT testing is accomplished in a differential scanning calorimeter with an OIT test cell. The test conditions are: uncrimped aluminum pan; no screen; heat up to 200° C. under nitrogen, followed by a switch to a 50 milliliter flow of oxygen. Oxidation induction time (OIT) is the time interval between the start of oxygen flow and the exothermic decomposition of the test specimen. OIT is reported in minutes; the greater the number of minutes, the better the OIT. OIT is used as a measure of the oxidative stability of a sample as it proceeds through the cable filler grease exposure and the oxidative aging program. Relative performance in the grease filled cable applications can be predicted by comparing initial sample OIT to OIT values after 70° C. cable filler grease exposure and 90° C. oxidative aging.

Variables and results are set forth in the following Table.

| Components | Example 1 | Example 2 | Example 3 |
|---|---|---|---|
| | (Percent by weight) | | |
| Antioxidant A | 0.50 | 0.50 | 0.50 |
| Antioxidant B | 0.10 | none | none |
| Antioxidant C | none | 0.10 | none |
| Polyethylene | 99.40 | 99.40 | 99.50 |
| | [OIT (minutes)] | | |
| Initial | 231 | 194 | 176 |
| 1 week | 216 | 175 | 150 |
| 2 weeks | 214 | 177 | 163 |
| 4 weeks | 209 | 178 | 140 |
| 8 weeks | 195 | 155 | 99 |

We claim:

1. A cable construction comprising the following components: (i) a plurality of insulated electrical conductors having interstices therebetween, said insulation comprising (a) one or more polyolefins selected from the group consisting of polyethylene, polypropylene, and mixtures thereof, and, blended therewith, (b) a mixture containing one or more alkylhydroxy-phenylalkanoyl hydrazines and one or two functionalized hindered amines; (ii) hydrocarbon cable filler grease within the interstices; and (iii) a sheath surrounding components (i) and (ii) wherein said hindered amines have the following structural formulae in which n is about 2 to about 10:

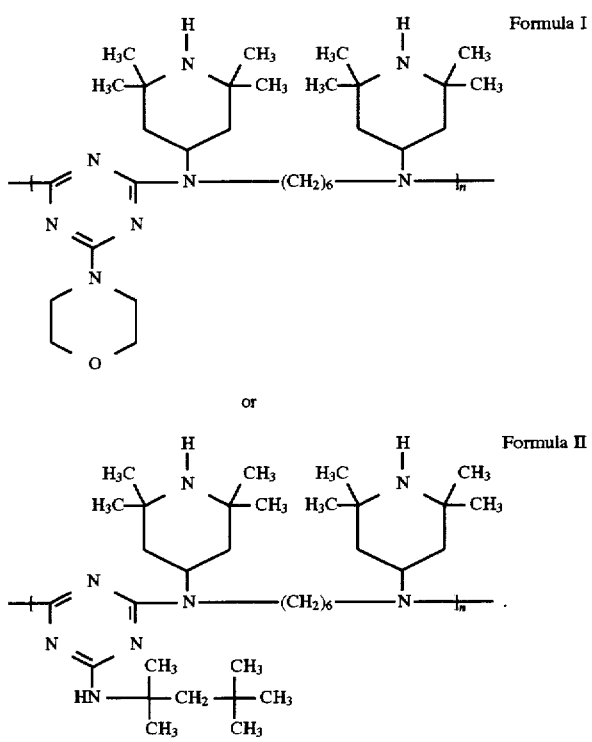

2. The cable construction defined in claim 1 wherein the hydrazine has the following structural formula:

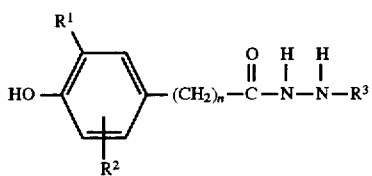

wherein n is 0 or an integer from 1 to 5;

$R^1$ is an alkyl having 1 to 6 carbon atoms;

$R^2$ is hydrogen or $R^1$; and $R^3$ is hydrogen, an alkanoyl having 2 to 18 carbon atoms or the following structural formula:

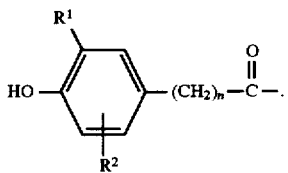

3. The cable construction defined in claim 2 wherein the hydrazine is 1,2-bis(3,5-di-tert-butyl-4-hydroxyhydrocinnamoyl) hydrazine.

4. The cable construction defined in claim 2 wherein the hindered amine is poly[(6-morpholino-s-triazine-2,4-diyl) [2,2,6,6-tetramethyl-4-piperidyl) imino]-hexamethylene[(2, 2,6,6-tetramethyl-4-piperidyl) imino]] and/or poly[[6-[(1,1, 3,3-tetramethylbutyl)amino]-s-triazine-2,4-diyl][(2,2,6,6-tetramethyl-4-piperidyl) imino] hexamethylene[(2,2,6,6-tetramethyl-4-piperidyl) imino]].

5. The cable construction defined in claim 1 wherein, for each 100 parts by weight of polyolefin, the hydrazine(s) are present in an amount of at least about 0.1 part by weight and the hindered amine(s) are present in an amount of at least about 0.01 part by weight.

6. The cable construction defined in claim 1 wherein the weight ratio of hydrazine to hindered amine is in the range of about 1:1 to about 20:1.

7. The cable construction defined in claim 1 wherein the hydrocarbon cable filler grease or one or more of the hydrocarbon constituents thereof is present in the insulation of component (i).

8. The cable construction defined in claim 7 wherein the amount of hydrocarbon cable filler grease or one or more of the hydrocarbon constituents thereof, in toto, present in the insulation of component (i) is in the range of about 3 to about 30 parts by weight based on 100 parts by weight of polyolefin.

9. A cable construction comprising the following components: (i) a plurality of insulated electrical conductors having interstices therebetween, said insulation comprising (a) one or more polyolefins selected from the group consisting of polyethylene, polypropylene, and mixtures thereof, and, blended therewith, (b) a mixture containing one or more alkylhydroxy-phenylalkanoyl hydrazines wherein the alkyl has 1 to 6 carbon atoms and the alkanoyl has 2 to 18 carbon atoms and one or two functionalized hindered amines; (ii) hydrocarbon cable filler grease within the interstices; and (iii) a sheath surrounding components (i) and (ii) wherein said hindered amines are poly[(6-morpholino-s-triazine-2,4-diyl) [2,2,6,6-tetramethyl-4-piperidyl) imino]-hexamethylene[(2,2,6,6-tetramethyl-4-piperidyl) imino]] and poly[[6-[(1,1,3,3-tetramethylbutyl)amino]-s-triazine-2, 4-diyl[](2,2,6,6-tetramethyl-4-piperidyl)imino] hexamethylene[(2,2,6,6-tetramethyl-4-piperidyl) imino]].

10. The cable construction defined in claim 9 wherein the weight ratio of the hydrazine to hinderd amine is in the range of about 3:1 to about 10:1.

* * * * *